United States Patent
Welker (10) Patent No.: US 7,203,130 B1
(45) Date of Patent: Apr. 10, 2007

(54) METHODS FOR DERIVING SHAPE OF SEISMIC DATA ACQUISITION CABLES AND STREAMERS EMPLOYING A FORCE MODEL

(75) Inventor: Kenneth E. Welker, Nesoya (NO)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 11/385,272

(22) Filed: Mar. 21, 2006

(51) Int. Cl.
*G01V 1/38* (2006.01)

(52) U.S. Cl. .......................................... 367/16; 367/19

(58) Field of Classification Search ................. 367/16, 367/19; 702/14
See application file for complete search history.

(56) References Cited

U.S. PATENT DOCUMENTS

| | | | |
|---|---|---|---|
| 4,404,664 A | 9/1983 | Zachariadis | |
| 4,992,990 A | 2/1991 | Langeland | |
| 5,668,775 A | 9/1997 | Hatteland | |
| 5,761,153 A * | 6/1998 | Gikas et al. | 367/19 |
| 6,418,378 B1 * | 7/2002 | Nyland | 702/14 |
| 6,590,831 B1 * | 7/2003 | Bennett et al. | 367/16 |
| 6,671,223 B2 | 12/2003 | Bittleston | |
| 6,775,619 B2 * | 8/2004 | Nyland | 702/14 |

FOREIGN PATENT DOCUMENTS

EP 525391 B1 6/1992

OTHER PUBLICATIONS

Dowling, The Dynamics of Towed Flexible Cylinders Part I Neturally Buoyant Elements, J Fluid Mechanics V 187 pp. 507-532, 1988.
Dowling, The Dynamics of Towed Flexible Cylinders Part II Negatively Buoyant Elements, J Fluid Mechanics, 187 pp. 533-571, 1988.
Tritton, Physical Fluid Dynamics, Oxford Science Publications, 1988.

* cited by examiner

Primary Examiner—Mark Hellner (57) ABSTRACT

Methods and systems for determining position of one or more portions of a seismic streamer, which portions may be seismic receivers, are disclosed. One method includes measuring one or more characteristics of one or more steering devices positioned at known distances along a marine seismic streamer; using the measured characteristic to calculate a force on at least a portion of the streamer exerted by one or more steering devices from the characteristics; and using the calculated force to estimate position of at least a portion of the streamer. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims.

21 Claims, 3 Drawing Sheets

METHODS FOR DERIVING SHAPE OF SEISMIC DATA ACQUISITION CABLES AND STREAMERS EMPLOYING A FORCE MODEL

BACKGROUND OF THE INVENTION

1. Field of Invention

The present invention relates to the field of marine seismic data acquisition systems and methods of using same. More specifically, the invention relates to systems and methods for positioning of seismic streamers.

2. Related Art

Marine seismic exploration investigates and maps the structure and character of subsurface geological formations underlying a body of water. For large survey areas, a seismic spread may have vessels towing multiple seismic streamer cables through the water, and one or more seismic sources by the same or different vessel. The seismic sources typically comprise compressed air guns for generating acoustic pulses in the water. The energy from these pulses propagates downwardly into the geological formations and is reflected upwardly from the interfaces between subsurface geological formations. The reflected energy is sensed with hydrophones attached to the seismic streamers, and data representing such energy is recorded and processed to provide information about the underlying geological features.

Streamers are typically positioned with acoustic ranging devices attached to or integrated into the streamers. The performance of the acoustic ranging devices varies throughout the spread for a variety of reasons. These hindrances to acoustic propagation include bubbles in the water column generated by the seismic source, density layering in the water column causing refraction and reflection of the acoustic energy, and interference from bottom reflected signals. In an attempt to deal with the degraded acoustic performance due to these factors, the individual distance measurements are often manually and interactively filtered before the distances are introduced to the position estimation algorithms. Further, the subjectivity of manual filtering can give position estimate biases, and is in any case labor intensive. In some cases the degraded acoustic performance is so severe that filtering is not possible and re-acquisition is required, (at great expense) and only possible when the acoustic propagation environment changes to allow it. When adequate relative positions are determined through acoustic ranging and other types of relative positioning measures such as compasses, baseline distances, and inertial positioning units, a link is needed to an earth fixed reference frame. This is typically achieved through the Global Positioning System (GPS) using receivers mounted on buoys or floats attached to the streamers and sources of the seismic spread. These floats are connected at points away from the seismic hydrophones to prevent tugging noise at the hydrophones. The longer the distance along the streamer away from the GPS control points, the greater the degradation of positioning accuracy throughout the spread. The current state of the art is to asymmetrically deploy tail buoys at the front and tail of the spread, with fewer floats at the front due to the towing and handling challenges encountered near the seismic source.

Steering devices along the streamer cause the streamer to deform in a deterministic way. The physics of the deformation have been described elsewhere. Conventional streamer positioning uses compasses and assumes a straight shape. On a streamer using lateral steering devices, such as steerable birds known under the trade designation Q-FIN™, from WestemGeco L.L.C., Houston, Tex., the streamer shape is non straight due to lateral forces exerted by the wings of the steerable birds. Direction measures tangent to the cable will give erroneous position estimates on a steered cable since the conventional straight cable assumption is untrue. In order to address this problem, intrinsic ranging using modulated acoustics was developed to give a high density of acoustic points along the streamer. The points are so close that an arc formed between them is approximately a straight line. However, these acoustic ranging techniques still require knowledge of the acoustic propagation velocity, which as explained is not constant through a spread.

An alternate method of positioning acoustic receivers along a data acquisition cable or streamer that would not depend on acoustic propagation velocity would be beneficial. The methods and systems of the present invention address this problem.

SUMMARY OF THE INVENTION

In accordance with the present invention, systems and methods are described for estimating position of at least a portion of a seismic streamer. The systems and methods of the invention reduce or overcome problems with previous systems and methods. Systems and methods of the invention may be used to collect marine seismic data, for example 3-D and 4-D marine seismic data.

It has now been determined possible to describe the shape of a streamer or a portion thereof between laterally steering devices if the forces exerted by the steering devices on the streamer are known. This allows the streamer to be positioned between the steering devices. This may be accomplished by measuring the forces exerted by the wings, the tension in the streamer, the angle of incidence of the streamer to the flow direction, and the streamer relative water speed, and combining this information with the streamer diameter in the equations of motion. Such a method will give the positions of the seismic receivers along the cable with adequate precision for seismic image processing and provide a reasonable relation between adjacent streamers as to allow streamer steering. The methods of the invention apply to any type of lateral steering device attached to a cable and exerting a lateral force at a point along the cable. Stated differently, the invention is to use force measurements, derived from the steering device wing angles and relative water speed, to position of at least a portion of a streamer or other cable, and may be used to estimate acoustic and other sensors, such as acoustic hydrophone receivers along the cable.

A first aspect of the invention comprises methods of determining position of at least a portion of a marine seismic streamer, one method comprising:

(a) measuring one or more characteristics of one or more steering devices positioned at known distances along a marine seismic streamer in a marine seismic spread;

(b) using the measured characteristic to calculate a force applied to the streamer; and (c) using the calculated force to estimate position of at least a portion of the streamer.

Methods of the invention include those wherein the marine steering devices are steerable birds having one or more wings, and the measuring of one or more characteristics of multiple steering devices comprises measuring force exerted by the wings of each steering device. Optionally, streamer parameters may be used in the calculation. As used herein the phrase "streamer parameters" includes, but is not limited to, tension in the streamer, the angle of incidence of the streamer to the flow direction, streamer relative water speed, streamer diameter, streamer density, and the like. Knowledge of streamer parameters is optional in the sense that, while it would be beneficial to have such knowledge, the actual physical parameters of the streamer may be different from what the survey team believes. If the survey crew did not in fact know the streamer parameters, or thought they had one type of streamer but actually had another (lighter streamer for example). If the estimated streamer position calculated from steering device characteristics is "off" by an unacceptable amount, this might indicate a damaged streamer, or a different streamer, or some other condition (tangled streamers). This could be a way of identifying a damaged streamer. Methods of the invention may include sensing earth-based position of the seismic streamer or portions thereof and/or the positioning streamer through use of satellite receivers spaced as desired in the spread, which may be regularly or randomly spaced. Methods of the invention include those wherein at least one seismic receiver position is known, and the position of a neighboring seismic receiver is estimated. As used herein, "estimating position of at least a portion of a streamer" includes use of the equations of motion, and may include other information and/or calculations and algorithms. One method embodiment comprises sensing position of sensors on or in the streamer, including seismic receivers, which may be hydrophones, between steering devices using a plurality of global positioning receivers, for example a unit every 1000 meters, rather than just one near the front and one near the tail of the streamer. In some embodiments, the inventive methods comprise stationing a satellite receiver near a quarter point between a midpoint and a tail of one or more seismic streamers. Methods including stationing a satellite receiver near a quarter point between the midpoint of the seismic streamer and the towing vessel are also contemplated.

A second aspect of the invention is a system comprising:
(a) a marine seismic streamer adapted to be towed by a towing vessel, the streamer comprising one or more steering devices positioned at known distances along the marine seismic streamer;
(b) the steering devices further comprising a sensor adapted to measure at least one characteristic of the steering device; and
(c) a calculation unit adapted to calculate a force on the streamer exerted by at least one of the steering devices from the measured characteristics and use the calculated force to estimate a position of a portion of the marine seismic streamer.

The portion of the streamer may be a sensor, such as a temperature, pressure, or acoustic seismic sensor, and the seismic sensor may be a hydrophone. Other streamer portions include an acoustic positioning receiver, a transceiver, a depth meter, an inertial sensor, a satellite signal receiver, a salinity sensor, a steering device, and a connector. A transceiver is a dual functioning unit that both transmits and receives acoustic signals. Systems of the invention may also utilize buoy-mounted acoustic transmitters and/or receivers wherein the buoys are tethered to something other than the streamers, such as a buoy anchored in a channel.

Systems of the invention may include satellite-based global positioning control points (satellite receivers) spaced as desired throughout the spread, either regularly or randomly spaced. The satellite receivers may be stationed on floatation devices, for example buoys, tethered to a streamer. A satellite receiver may be stationed near a quarter point between a midpoint and a tail of one or more seismic streamers. It is also within the invention to station a satellite receiver near a quarter point between the midpoint of the seismic streamer and the towing vessel. As with acoustic transmitters and receivers, the invention contemplates usage of buoy-mounted satellite receivers in conjunction with one or more streamer mounted satellite receiver, wherein some of the buoys are not attached to any spread element, but anchored to some other location.

Systems of the invention include those systems wherein the seismic streamers may be positioned in over/under arrangement, or offset horizontally. It is not necessary that streamers follow any defined path or trajectory, as long as it is possible to determine forces exerted on at least a portion of the streamers by the steering devices and use this information in calculating position of receivers or other components between steering devices. Systems of the invention may comprise inertial positioning components, in instances when satellite communication is blocked or unavailable. Systems of the invention may include means for communicating positions of the seismic streamers and/or receivers to the vessel or other information repository or controller (such as steering device controllers) requiring the information.

Systems and methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

Figure 1:
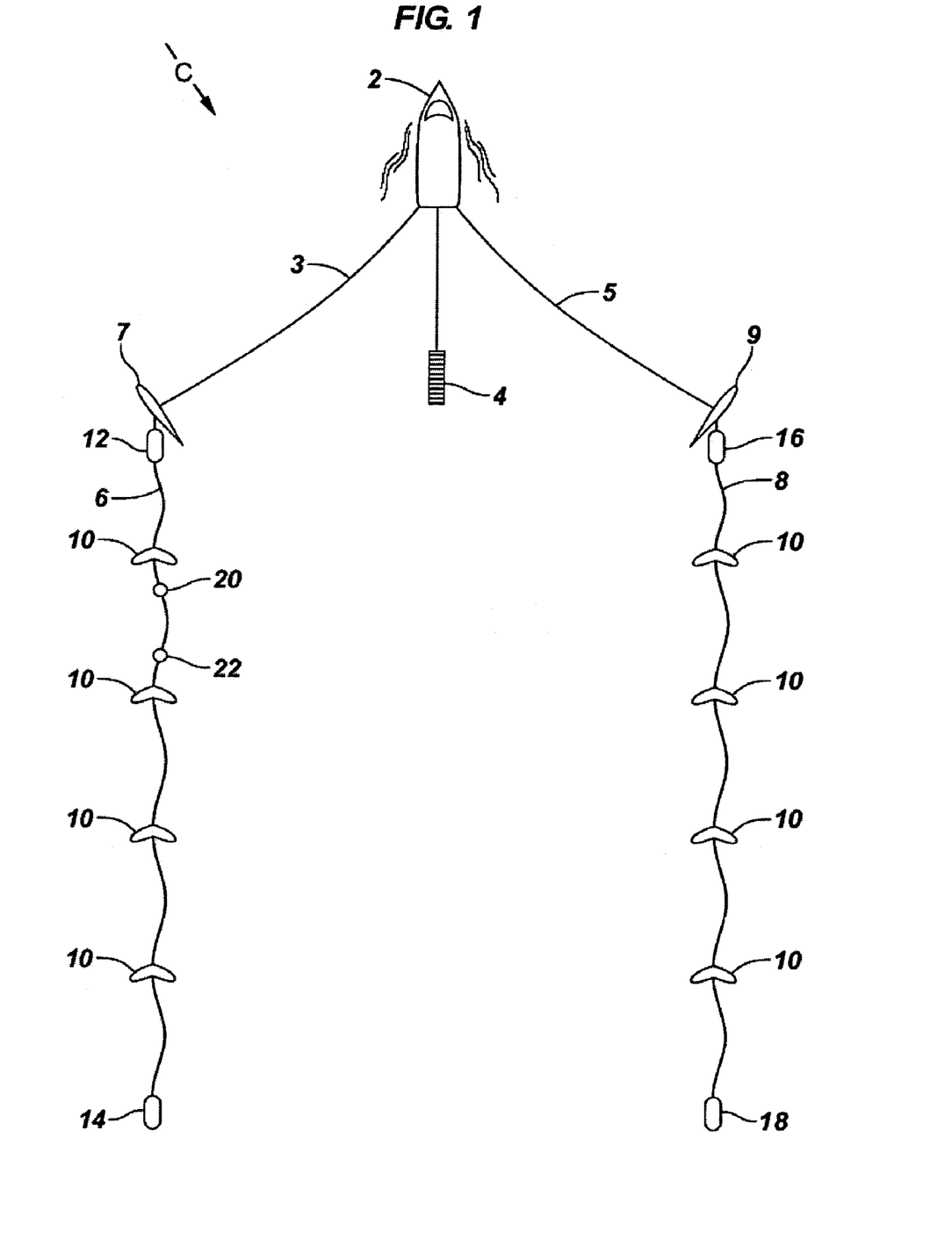
FIG. 1 illustrates a simplified schematic plan view of a towed streamer seismic spread that may benefit from the methods and systems of the invention.

As illustrated schematically in FIG. 1, in order to perform marine seismic surveys, one or more marine seismic streamers 6, 8, each typically several thousand meters long and containing a large number of hydrophones and associated electronic equipment distributed along its length, is towed at about 5 knots behind a seismic survey vessel 2 using tow cables 3 and 5, which also may tow one or more seismic sources 4 comprising source members, typically air guns. Streamers 6 and 8 may be outer-most streamers of a greater number of streamers than depicted in FIG. 1, and then might be diverted by streamer diverters 7 and 9. Acoustic signals produced by seismic sources 4 are directed down through the water into the earth beneath, where they are reflected from the various strata. The reflected signals may be received by numerous acoustic receivers (hydrophones) in the streamers, as indicated at 20, 22, digitized and then transmitted to the seismic survey vessel, where they may be recorded and at least partially processed with the ultimate aim of building up a representation of the earth strata in the area being surveyed. In recent years, seismic streamers have included acoustic ranging systems, wherein acoustic transmitters and receivers (or transducers performing both functions of transmitting and/or receiving) are stationed strategically in the streamers and dedicated to determining position of the streamers. Note that acoustic transducers exist that are dual functioning units, both transmitting and receiving, and these may be used to determine distance between points on one or more seismic streamers and cables. One may speak of acoustic networks (or simply "nets") of transmitters and receivers placed, for example, at the midpoint of the streamers, thus forming a mid-point acoustic net, at the tail of the streamers forming a tail acoustic net, at the front of the streamers forming a front-end acoustic net, and/or quarter points of streamers, forming quarter point acoustic nets, and so on. Finally, if the acoustic positioning transmitters and receivers are placed generally throughout the streamers, one may speak of a so-called full-length acoustic net, which is in effect a single acoustic net. Satellite receivers stationed at the tow vessel and the end of the streamers on buoys 12, 14, 16, and 18 help determine the earth-oriented position. However, due to forces exerted on the streamers due to streamer steering devices 10, even full streamer length acoustic nets will not always function to determine position of streamers 6 and 8 accurately. Also, the further away from satellite receivers the acoustic positioning devices are in a particular net, the more any initial positioning uncertainty will grow.

Figure 2:
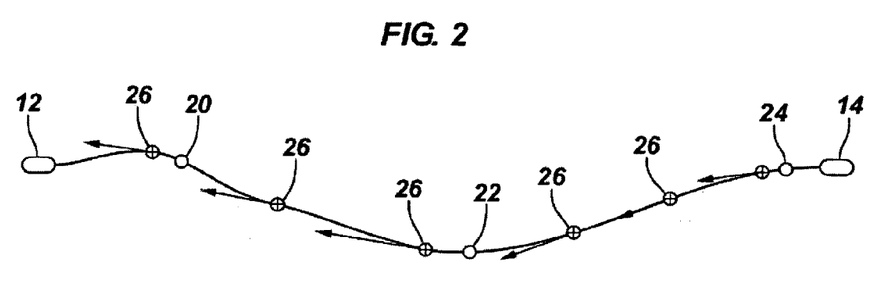
FIG. 2 illustrates a more detailed schematic of one streamer under the influence of current and steering devices, showing how an assumption of a straight streamer is untrue due to lateral forces on the streamer by the steering devices.

As depicted schematically in FIG. 1, a current indicated by arrow C tries to force streamers off the path intended by the survey operators, and numerous steering devices 10 are used to keep the streamers close to the intended path. However, as seen in FIG. 1, which is exaggerated, the steamer then assumes a shape that is bowed between steering members 10. As illustrated in FIG. 2, an assumption that the streamer is straight will then create positioning errors. Note the arrows in FIG. 2 indicating how the position predicted by direction compasses 26 creates errors. The present invention relates to various methods and systems for more accurately estimating position of seismic streamers (or portions thereof) between steering devices, and therefore the position of seismic receivers or other receivers and sensors in the streamers, by measuring the forces imposed on the streamer by the steering devices and currents. The information may be combined with streamer physical properties in the equations of motion to estimate positions of the streamer sections between steering devices. This may be accomplished by measuring the forces exerted by the wings, the tension in the streamer, the angle of incidence of the streamer to the flow direction, and the streamer relative water speed, and combining this information with the streamer diameter in the equations of motion. Such a method will give estimates of the positions of portions of the streamers, including seismic receivers and other sensors, along the cable with adequate precision for seismic image processing and provide a reasonable relation between adjacent streamers as to allow streamer steering. The methods of the invention apply to any type of lateral steering device attached to a cable and exerting a lateral force at a point along the cable. Stated differently, the invention is to use force measurements, derived from the steering device wing angles and relative water speed, to position receivers along the streamer.

Horizontal and vertical control of streamers is typically provided today by orientation members, which may be of any type as explained herein, such as small hydrofoils or birds that can provide forces in the vertical and horizontal planes. Orientation members may be equally spaced along the length of the streamers, and may be clamped to streamers, hung from streamers, or inserted inline in streamers to provide the desired vertical and horizontal position control. Additional orientation members may be placed at intervals between main orientation members for supplemental position control, for example to reduce streamer "sagging" between locations where main orientation members are located on streamers. In some embodiments of the invention it may be possible to change the streamer configuration during the seismic survey using orientation members, optionally assisted by a winching system or other arrangement to alter the length of cables. Towed streamer systems may become unstable due to geometry of the streamers, the point of application of, and direction of the applied forces, unpredicted/unexpected currents, and the like. This may cause steerable birds to generate undesirable forces on a streamer and cause seismic receiver positions, and positions of other sensors, to vary from where they were planned to be positioned by the survey team.

Figure 3:
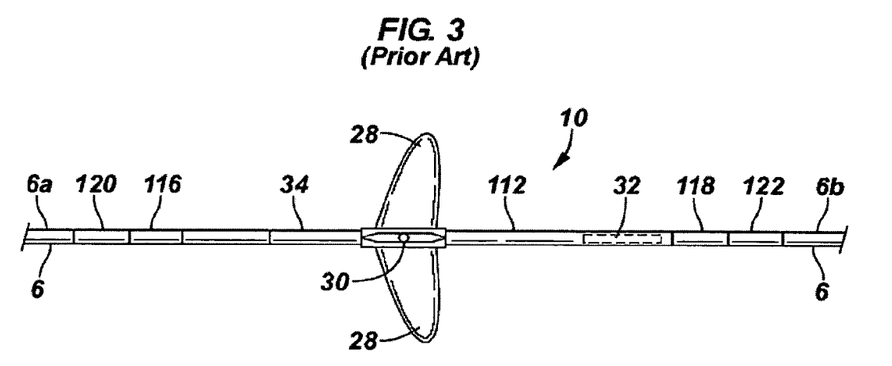
FIG. 3 is a schematic side elevation view of a prior art inline streamer steering device useful in the invention.

One type of orientation member which may be used in accordance with the invention is described in commonly assigned U.S. Pat. No. 6,671,223, describing a steerable bird known under the trade designation "Q-FIN", available from WesternGeco LLC, Houston, Tex., that is designed to be electrically and mechanically connected in series (i.e., in line) with a streamer. Steering may be achieved through lift afforded by two independent wings or fins that rotate around an axis perpendicular to the wing axis controller body. A further description can be found in reference to FIG. 3. The streamer control device, or "bird", of FIG. 3 is indicated generally at 10, and comprises an elongate streamlined body 112 adapted to be mechanically and electrically connected in series in a multi-section marine seismic streamer 6 of the kind which is towed by a seismic survey vessel and which is used, in conjunction with a seismic source which may also be towed by the vessel, to conduct marine seismic surveys, as briefly described hereinbefore. To permit such connection, each end of the body 112 is provided with a respective mechanical and electrical connector 116, 118, these connectors being complementary to, and designed to interconnect with, streamer end connectors 120, 122 respectively which are normally used to join together adjacent sections 6a and 6b of streamer 6. Bird 10 is provided with two opposed control surfaces, or wings, 28, typically molded from a fiber-reinforced plastics material, which project horizontally outwardly from the body 12 and which are independently rotatable about a common axis extending substantially perpendicularly through the longitudinal axis of the body.

Figure 4:
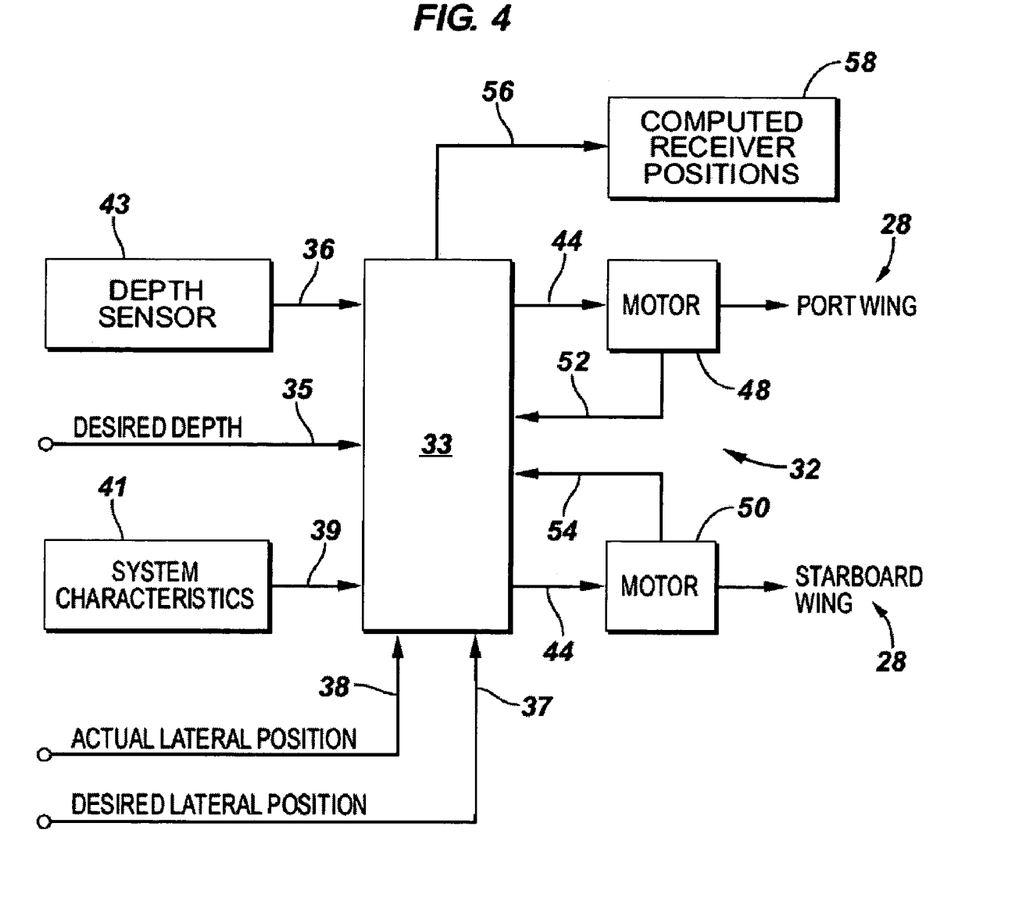
FIG. 4 is a schematic illustration of a control system useful in implementing methods and systems of the invention.

Rotation of the wings 28 is affected under the control of a control system 32 (see also FIG. 4) sealingly housed within body 112. Wings 28 are generally ogival (i.e., rounded) and swept back with respect to the direction of tow of the streamer 6, in order to reduce the possibility of debris becoming hooked on them. To facilitate their rapid removal and reattachment, wings 28 are secured to body 112 by a quick-release attachment 30. As mentioned hereinbefore, streamer 6 includes hydrophones distributed along its length; it also includes control and conversion circuitry for converting the outputs of the hydrophones into digital data signals, longitudinally extending control and data lines for conducting control and data signals to and from the control and conversion circuitry, and electrical power supply lines for supplying electrical power from the vessel to the circuitry. All these lines are coupled together from streamer section 6a to streamer section 6b via respective corresponding lines 34 which extend through body 112 of bird 10 between the connectors 116, 118. As illustrated in FIG. 4, control system 32 is connected to receive control signals for desired depth 35 and actual depth 36 though a depth sensor 40, desired lateral position 37 actual lateral position 38, and system characteristics 41, 39, such as steerable bird wing angles and wing areas, current vector information, streamer diameter and material of construction, GPS coordinates of one or more buoys and nearby receivers, and the like, and electric power from respective ones of the lines 34. A calculation unit 33 computes adjustments 44 for motors 48 and 50 driving wings 28, and outputs 56 computed position 58 of a portion of the streamer, which may be a seismic receiver on or in the streamer, based on the input data and using the equations of motion. The position of wings 28 may also reported back to calculation unit 33 as indicated at 52 and 54. Calculation unit 33 may include software and hardware allowing the implementation of one or more equations of motion, as well as other algorithms and operations as required, as well as data warehouses and the like.

In operation, the control circuit receives between two inputs a signal indicative of the difference between the actual and desired depths of a bird, and receives between other inputs a signal indicative of the difference between the actual and desired lateral positions of a bird. These two difference signals are used by the control circuit to calculate the roll angle of the bird and the respective angular positions of the wings which together will produce the necessary combination of vertical force (upwardly or downwardly) and lateral force (left or right) required to move the bird to the desired depth and lateral position. The control circuit then adjusts each of the wings independently by means of the stepper motors so as to start to achieve the calculated bird roll angle and wing angular positions.

In cases where a streamer is slightly heavy (slightly negative buoyancy), and the bird thus needs to produce lift to maintain the streamer at the desired depth, this lift may be produced by the flow of the water over the wings of the bird, resulting from the towing speed of the streamer through the water, and can be changed by changing the angle of attack of the wings with respect to the flow. The magnitude of the lift required depends on how far the streamer is off of target depth and/or lateral position. If the streamer needs to be moved laterally, the angular position of one wing of the bird may first be adjusted to increase its lift, while the angular position of the other wing is adjusted to decrease its lift, thus causing the bird to roll clockwise or counterclockwise as desired. This roll continues until the bird reaches a steady state condition, where the vertical component of the lift produced by the wings is equal to the lift required to maintain the streamer at the desired depth, while the much larger horizontal component moves the streamer laterally as desired.

While adjusting the angular positions of the wings of the bird, the control circuit continuously receives signals representative of the actual angular positions of the wings from the stepper motors, as well as a signal representative of the actual roll angle of the bird from an inclinometer, to enable it to determine when the calculated wing angular positions and bird roll angle have been reached. And as the aforementioned difference signals reduce, the control circuit repeatedly recalculates the progressively changing values of the roll angle of the bird and the angular positions of the wings required for the bird and streamer to reach the desired depth and lateral position, until the bird and streamer actually reach the desired depth and lateral position.

The body of the bird does not rotate with respect to the streamer, and thus twists the streamer as it rolls. The streamer resists this twisting motion, so acting as a kind of torsion spring which tends to return the bird to its normal position (i.e. with the wings extending horizontally). However, this spring returning action, though beneficial, is not essential, and the bird can if desired be designed to rotate to a certain extent with respect to the axis of the streamer.

In order to optimize towed streamer marine seismic data acquisition, accurate position estimates of seismic receivers in streamers are required. Force models of the streamers may provide better receiver position estimates than previous methods. The direction and speed of the water flow past a streamer, (i.e., current relative to the streamer, and to wings of steering devices) may be determined within a common absolute reference frame, such as the World Geodetic System-1984 (WGS-84). For example, the combined vectors for ocean current and vessel motion give the water flow vector. Estimates of varying precision and accuracy for the streamer orientation exist. The streamer orientation uncertainty is due to at least two model errors; the streamer shape model between the steering devices and the unmodeled misalignment of the steering device relative to the longitudinal streamer axis.

Several methods can be used to advantage to calculate forces on a streamer in the absence of this information. The least precise is to assume the angle of attack of a streamer does not change and use a reasonable value and accept the accompanying error. An improvement on this method is to assume that the streamer is straight. A refinement again is to accept that the streamer is not straight and to use a function that approximates the streamer shape. These methods provide a more precise orientation estimate for the streamer than simply assuming the streamer is straight, however they are still estimates. Rather than using a streamer shape model, the best way to determine forces on a streamer is by measuring one or more characteristics of the steering devices and using this information to calculate the forces the steering devices are exerting on the streamer or portions thereof. This invention describes how to do this through several measurement mechanisms and calculating the forces using the equations of motion.

Knowing the respective wing surface areas, wing shapes, and the water flow vector over the wings, one can calculate the forces exerted by the wings, and thus by the steering devices. Tension in the streamer cable may be measured using suitable devices, and the diameter and materials of construction of the streamer are known. It is then possible to calculate the position of a portion of the streamer, such as a seismic receiver, at time $t_1$ relative to a known position of a receiver at time to using this information and the equations of motion. Examples of using the equations of motion relative to towed flexible cylinders was addressed by Dowling in at least two articles, which are incorporated by reference herein: Dowling, A. P., "The Dynamics of Towed Flexible Cylinders Part I. Neutrally Buoyant Elements", J. Fluid Mechanics, V. 187, pp507–532 (1988); and Dowling, A. P., "The Dynamics of Towed Flexible Cylinders Part II. Negatively Buoyant Elements", J. Fluid Mechanics, V. 187, pp533–571 (1988). Mathematical treatment of wings, including spanning area and lift and drag coefficients, was address by Tritton in 1988: Tritton, D. J., "Physical Fluid Dynamics", Second Ed., Chapter 3, pp 153–161, Oxford Science Publications (1988), which is also incorporated by reference herein.

The initial lateral position of one or more steerable birds in a marine seismic spread that is close to a GPS receiver in the spread may be determined for instance by using GPS alone or combined with an acoustic positioning system, such as a short-baseline (SBL) or ultra-short baseline (USBL) acoustic system. By further using measured characteristics of steering devices, and calculating the forces exerted on the streamer or portions thereof by the steering devices, it is possible to calculate the position of a portion of the streamer, such as an acoustic receiver, at times $t_1, t_2, t_n$, at least relative to a known position. All receivers in or on a streamer cable, including receivers on birds, and other sensors and portions of a streamer, can this way be tracked for the purpose of deployment precision, increased operational safety, and increased efficiency.

It is within the invention to combine systems of the invention with other position control equipment, such as source array deflecting members, and streamer deflectors. Some of these may include bridle systems, pneumatic systems; hydraulic systems, and combinations thereof.

Materials of construction of orientation members and streamers useful in systems and methods of the invention may vary. However, there may be a need to balance the seismic equipment so that the system is balanced to be neutrally buoyant in the water, or nearly so, to perform its intended function. Polymeric composites, with appropriate fillers used to adjust buoyancy and mechanical properties as desired, may be employed.

In certain embodiments, regardless of the acoustic environment, a higher density of global positioning control points throughout the spread will improve overall accuracy by decreasing the distance between these points and the associated degradation of accuracy.

Other steerable birds useful in the invention include battery-powered steerable birds suspended beneath the streamer and including a pair of laterally projecting wings, the combination of streamers, orientation members (steerable birds) being arranged to be neutrally buoyant. Clamp-on steerable birds, as discussed previously, may also be employed. Steerable birds useful in the invention, including suspended birds, in-line birds, and clamp-on birds may include on-board controllers and/or communications devices, which may be microprocessor-based, to receive control signals representative of desired depth, actual depth, desired lateral position, actual lateral position and roll angle of the steerable bird. The bird on-board controllers may communicate with local controllers mounted on or in other birds, and/or communicate with other local controllers and/or remote controllers, such as a supervisory controller.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. A method comprising:
   (a) measuring one or more characteristics of one or more steering devices positioned at known distances along a marine seismic streamer in a marine seismic spread;
   (b) using the measured characteristic to calculate a force applied to the streamer as a result of steering by the one or more steering devices; and
   (c) using the calculated force to estimate a position of at least one portion of the streamer away from the one or more steering devices.

2. The method of claim 1 wherein at least some of the steering devices are steerable birds having wings.

3. The method of claim 2 wherein the measuring of one or more characteristics of one or more steering devices is selected from angle of wings to a reference, stepper motor settings, controller set points, and combinations thereof.

4. The method of claim 1 including using one or more streamer parameters to calculate the force, wherein streamer parameters are selected from tension in the streamer, angle of incidence of the streamer to flow direction, streamer relative water speed, streamer diameter, streamer density, and combinations thereof.

5. The method of claim 1 comprising sensing earth-based position of points on the seismic streamer through use of satellite receivers spaced as desired in the spread, which may be regularly or randomly spaced.

6. The method of claim 1 wherein the streamer comprises a plurality of seismic receivers, at least one seismic receiver position is known, and the position of a neighboring seismic receiver is estimated.

7. The method of claim 1 wherein estimating position of the at least one portion of the streamer includes use of the equations of motion, and may include other information and/or calculations and algorithms.

8. The method of claim 1 comprising sensing position of seismic receivers between steering devices using a plurality of global positioning receivers placed on or in the streamer.

9. The method of claim 1 comprising stationing a satellite receiver near a quarter point between a midpoint and a tail of the streamer.

10. The method of claim 1 comprising stationing a satellite receiver near a quarter point between the midpoint of the streamer and a towing vessel that tows the streamer.

11. The method of claim 1 comprising controlling the steering devices using a control system.

12. The method of claim 1 wherein the position estimate employs an acoustic network.

13. The method of claim 1 wherein the portion of the streamer is selected from a seismic receiver, a hydrophone, an acoustic positioning receiver, a transceiver, a depth meter, an inertial sensor, a satellite signal receiver, a temperature sensor, a pressure sensor, a salinity sensor, a steering device, and a connector.

14. A method comprising:
(a) measuring wing angles of one or more marine steerable birds having at least one wing, the steerable birds positioned at known distances along a seismic streamer in a marine seismic spread;
(b) using an angle of the at least one wings of the bird to calculate a force applied to the streamer as a result of steering by the one or more marine steerable birds; and
(c) using the calculated force with knowledge of streamer parameters selected from tension in the streamer, angle of incidence of the streamer to flow direction, streamer relative water speed, streamer diameter, streamer density, and combinations thereof to estimate a position of at least one portion of the streamer away from the one or more marine steerable birds.

15. The method of claim 14 wherein estimating position of at least one portion of the streamer includes use of the equations of motion, and may include other information and/or calculations and algorithms.

16. The method of claim 14 wherein the position estimate employs an acoustic network, and the portion of the streamer is selected from a seismic receiver, a hydrophone, an acoustic positioning receiver, a transceiver, a depth meter, an inertial sensor, a satellite signal receiver, a temperature sensor, a pressure sensor, a salinity sensor, a steering device, and a connector.

17. A system for acquiring marine seismic data, the system comprising:
(a) a marine seismic streamer adapted to be towed by a towing vessel, the streamer comprising one or more steering devices positioned at known distances along the marine seismic streamer;
(b) the steering devices further comprising a sensor adapted to measure at least one characteristic of the steering device; and
(c) a calculation unit calculating a force on the streamer exerted by at least one of the steering devices as a result of steering by the one or more steering devices from the measured characteristics and use the calculated force to estimate a position of a portion of the marine seismic streamer away from the one or more steering devices.

18. The system of claim 17 wherein at least one of the steering devices is a steerable bird having one or more wings, and wherein the characteristic of the steering device is selected from angle of a wing to a reference, stepper motor settings, controller set points, and combinations thereof.

19. The system of claim 17 wherein the calculation unit is adapted to use at least one streamer parameter, the streamer parameter selected from tension in the streamer, angle of incidence of the streamer to flow direction, streamer relative water speed, streamer diameter, streamer density, and combinations thereof.

20. The system of claim 17 wherein the calculation unit comprises means for implementing the equations of motion, and optionally other information and/or calculations and algorithms.

21. A method comprising:
(a) measuring one or more characteristics of one or more steering devices positioned at known distances along a marine seismic streamer in a marine seismic spread;
(b) using the one or more measured characteristic to calculate a force applied to the streamer as a result of steering by the one or more steering devices;
(c) using the calculated force to estimate a position of at least one portion of the streamer away from the one or more steering devices; and
(d) collecting marine seismic data using the streamer.

* * * * *

UNITED STATES PATENT AND TRADEMARK OFFICE
CERTIFICATE OF CORRECTION

PATENT NO. : 7,203,130 B1 Page 1 of 1
APPLICATION NO. : 11/385272
DATED : April 10, 2007
INVENTOR(S) : Kenneth E. Welker It is certified that error appears in the above-identified patent and that said Letters Patent is hereby corrected as shown below:

On the Title Page, Item (56), right column, under OTHER PUBLICATIONS, line 2, delete "Neturally" and insert -- Neutrally -- therefore.

On the Title Page, Item (73), delete "WestermGeco" and insert -- WesternGeco -- therefore.

Signed and Sealed this

Twenty-eighth Day of August, 2007

JON W. DUDAS
*Director of the United States Patent and Trademark Office*